(12) United States Patent
Chilimbi et al.

(10) Patent No.: US 8,914,781 B2
(45) Date of Patent: Dec. 16, 2014

(54) SCALABILITY ANALYSIS FOR SERVER SYSTEMS

(75) Inventors: Trishul A. Chilimbi, Seattle, WA (US); Chen Ding, Rochester, NY (US)

(73) Assignee: Microsoft Corporation, Redmond, WA (US)

( * ) Notice: Subject to any disclaimer, the term of this patent is extended or adjusted under 35 U.S.C. 154(b) by 1236 days.

(21) Appl. No.: 12/258,239

(22) Filed: Oct. 24, 2008

(65) Prior Publication Data

US 2010/0107142 A1   Apr. 29, 2010

(51) Int. Cl.
*G06F 9/44* (2006.01)
*G06F 9/45* (2006.01)
*G06F 11/34* (2006.01)
*G06F 12/08* (2006.01)

(52) U.S. Cl.
CPC .......... *G06F 11/3447* (2013.01); *G06F 8/4441* (2013.01); *G06F 2201/885* (2013.01); *G06F 12/0842* (2013.01); *G06F 11/3404* (2013.01)
USPC ........... 717/149; 717/104; 717/124; 717/151; 717/158

(58) Field of Classification Search
None
See application file for complete search history.

(56) References Cited

U.S. PATENT DOCUMENTS

| | | | |
|---|---|---|---|
| 6,070,009 A * | 5/2000 | Dean et al. | 717/130 |
| 6,282,613 B1 | 8/2001 | Hsu et al. | |
| 6,292,934 B1 | 9/2001 | Davidson et al. | |
| 7,356,805 B2 | 4/2008 | Ding et al. | |
| 7,454,666 B1 * | 11/2008 | Jordan et al. | 714/45 |
| 7,647,585 B2 * | 1/2010 | Sun | 717/128 |
| 7,802,236 B2 * | 9/2010 | Calder et al. | 717/130 |
| 7,805,580 B2 * | 9/2010 | Hirzel et al. | 711/154 |
| 8,127,280 B2 * | 2/2012 | Thomas et al. | 717/136 |
| 8,141,058 B2 * | 3/2012 | Berg et al. | 717/131 |
| 2002/0112227 A1 * | 8/2002 | Kramskoy et al. | 717/148 |
| 2004/0111708 A1 * | 6/2004 | Calder et al. | 717/131 |
| 2004/0154011 A1 * | 8/2004 | Wang et al. | 717/158 |
| 2006/0074970 A1 * | 4/2006 | Narayanan et al. | 707/102 |
| 2007/0067573 A1 * | 3/2007 | Bruening et al. | 711/125 |
| 2007/0124540 A1 | 5/2007 | van Riel | |
| 2007/0234016 A1 * | 10/2007 | Davis et al. | 712/227 |
| 2009/0125465 A1 * | 5/2009 | Berg et al. | 706/17 |

FOREIGN PATENT DOCUMENTS

WO   2008058292 A2   5/2008

OTHER PUBLICATIONS

Erik Berg, "A Statistical Multiprocessor Cache Model", 2006, pp. 11.*
Erik Berg, "A probabilistic approach to efficient and accurate data locality analysis", 2004.*

(Continued)

*Primary Examiner* — Isaac T Tecklu
(74) *Attorney, Agent, or Firm* — Sandy Swain; Raghu Chinagudabha; Micky Minhas

(57) ABSTRACT

Described is predicting cache locality in a multicore/multi-threaded processing environment including when threads share cache data in a non-uniform interleaving manner. Thread execution traces are analyzed to compute a set of per-thread parameters that can then be used to predict cache miss rates for other cache sizes. In one aspect, a model is based upon a probability that the cache reuse distance will increase because of accesses by other threads, and another probability that the reuse distance will decrease because of intercept accesses by other threads to shared data blocks. Estimates of the number of shared data blocks, possibly shared data blocks and private data blocks are used in the computations.

20 Claims, 5 Drawing Sheets

(56) References Cited

OTHER PUBLICATIONS

Weinberg, Jonathan, "Quantifying Locality in the Memory Access Patterns of HPC Applications", A thesis submitted in partial satisfaction of the requirements for the degree Master of Science in Computer Science, University of California, San Diego, Dated 2005, 50 Pages.

Lin, et al., "Data Locality Analysis and Optimization", Workshop Program, 5th International Workshop on Software and Compilers for Embedded Systems, Session 6: Program Analysis and Optimization, Dated : Mar. 2001, 5 Pages.

Jiang, et al., "COCA: A Locality-Aware Cooperative Cache Management Protocol to Improve Network File System Performance", In Proceedings of the 26th International Conference on Distributed Computing Systems: 42, Dated: 2006, 25 Pages.

Chen, et al., "Mapping of Applications to Heterogeneous Multi-cores Based on Micro-architecture Independent Characteristics", Third Workshop on Unique Chips and Systems,ISPASS2007 Dated: Apr. 2007, pp. 1-8.

Beyls, et al., "Visualization Enables the Programmer to Reduce Cache Misses", In Proceedings of Conference on Parallel and Distributed Computing and Systems, Dated: 2002, 6 Pages.

Agarwal, et al., "An Analytical Cache Model", ACM Transactions on Computer Systems, vol. 7, No. 2, Dated: May 1989, pp. 184-215.

Bennett, et al., "Adaptive Software Cache Management for Distributed Shared Memory Architectures", Special Issue: Proceedings of the 17th annual international symposium on Computer Architecture, ACM SIGARCH Computer Architecture News, vol. 18 , Issue 3a, Dated : Jun. 1990, pp. 125-134.

Blume, et al., "Parallel Programming with Polaris", This paper appears in: Computer, vol. 29, Issue 12, Publication Date: Dec. 1996, pp. 78-82.

Chandra, et al., "Predicting Interthread Cache Contention on a Chip Multi-Processor Architecture", Proceedings of the 11th International Symposium on High-Performance Computer Architecture, Year of Publication: 2005, pp. 340-351.

Ding, et al., "Predicting Whole-Program Locality with Reuse Distance Analysis", Conference on Programming Language Design and Implementation, Proceedings of the ACM SIGPLAN 2003 conference on Programming language design and implementation, Session: Code optimization II, Year of Publication: 2003, pp. 245-257.

Eggers, et al., "A Characterization of Sharing in Parallel Programs and its Application to Coherency Protocol Evaluation", ACM SIGARCH Computer Architecture News, vol. 16 , Issue 2, Dated: May 1988, pp. 373-382.

Falsafi, et al., "Modeling Cost/Performance of a Parallel Computer Simulator", ACM Transactions on Modeling and Computer Simulation, vol. 7, No. 1, Dated: Jan. 1997, pp. 104-130.

Hall, et al., "Interprocedural Parallelization Analysis in SUIF", ACM Transactions on Programming Languages and Systems, vol. 27, No. 4, Dated: Jul. 2005, pp. 662-731.

Hill, et al., "Evaluating Associativity in CPU Caches", Computers, IEEE Transactions on Computers, vol. 38, No. 12, Dated: Dec. 1989, pp. 1612-1630.

Hiranandani, et al., "Compiling Fortran D for MIMD Distributed-Memory Machines", Communications of the ACM, vol. 35 , Issue 8, Dated: Aug. 1992, pp. 66-80.

Jeremiassen, et al., "Reducing False Sharing on Shared Memory Multiprocessors through Compile Time Data Transformations", Proceedings of the fifth ACM SIGPLAN symposium on Principles and practice of parallel programming, Year of Publication: 1995, pp. 179-188.

Lu, et al., "Compiler and Software Distributed Shared Memory Support for Irregular Applications", ACM SIGPLAN Notices, vol. 32 , Issue 7, Dated: Jul. 1997, pp. 48-56.

Mattson, et al., "Evaluation Techniques for Storage Hierarchies", IBM System 1. 9, 2, Dated: 1970, pp. 78-117.

Smith, Alan Jay, "On the Effectiveness of Set Associative Page Mapping and its Applications in Main Memory Management", Proceedings of the 2nd international conference on Software engineering, Year of Publication: 1976, pp. 286-292.

Suh, et al., "Analytical Cache Models with Applications to Cache Partitioning", In the proceedings of the 15th International Conference on Supercomputing, Dated: Jun. 2001, 14 Pages.

Thiebaut, et al., Footprints in the Cache, ACM Transactions on Computer Systems (TOCS), vol. 5, Issue 4 Dated: Nov. 1987, pp. 305-329.

\* cited by examiner

SCALABILITY ANALYSIS FOR SERVER SYSTEMS

BACKGROUND

Future computing machines will likely include a greater number of processor cores, which will result in multi-threaded programs becoming more commonplace. However, developers of multi-threaded programs and hardware will need to carefully consider how memory usage is impacted by thread interaction on such machines.

More particularly, the memory performance of a multi-threaded program depends primarily on three factors, namely the shared cache, shared data, and thread interleaving with respect to data access. In general, a shared cache is a dynamic space in which cache blocks are fetched and replaced in response to accesses by different threads. Performance depends on the access location, as well as the access rate and amount of data access. With respect to performance impacts that result from cache usage, threads positively interact when shared data is brought into the cache by one thread and subsequently used by one or more other threads. Threads negatively interfere with one another when non-shared accesses contend for shared cache resources.

Cache interleaving refers to each thread's accessing of the cache during its execution time. For example, threads with uniform interleaving uniformly alternate their cache usage, while threads that carry out asymmetrical tasks produce irregular (non-uniform) interleaving.

The performance of applications running on multicore processors is thus significantly affected by on-chip caches. However, exhaustive testing of various applications on such machines (e.g., 32, 64, 128 and so forth cores) is not always feasible, as machines with fewer cores (e.g., 4-core or 8-core) machines are far more available in test environments than are the larger, expensive multicore machines that need to be used in an enterprise's commercial operations. An accurate cache locality model for multi-threaded applications that quantifies how concurrent threads interact with the memory hierarchy and how their data usage affects the efficiency and scalability of a system is thus very useful in evaluating software and hardware design decisions, and improving scheduling at the application, operating system, virtual machine, and hardware levels.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which the execution traces corresponding to cache data accesses by a plurality of threads (e.g., operating in a test environment) are used to determine a model for predicting cache locality in a computing environment having a larger number of threads. In one aspect, the model is based upon a probability that the distance between one thread's access of the same block of data in the cache (reuse distance) will increase because of accesses by other threads, and upon another probability that the reuse distance will decrease because of intercept accesses by other threads to data blocks that are shared with the one thread. In one aspect, determining the probabilities is based upon estimating a first set of data blocks that are always shared, estimating a second set of data blocks that are possibly shared, and/or estimating a third set of data blocks that are private.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards analyzing cache behavior to predict locality, without requiring exhaustive simulation and/or simulation on machines having the same number of cores as a test machine. To this end, the locality of concurrent applications is modeled by the change in the distance of data reuses in the cache, in a manner that considers data sharing and/or non-uniform thread interleaving among threads.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, caching and analysis in general.

Figure 1:
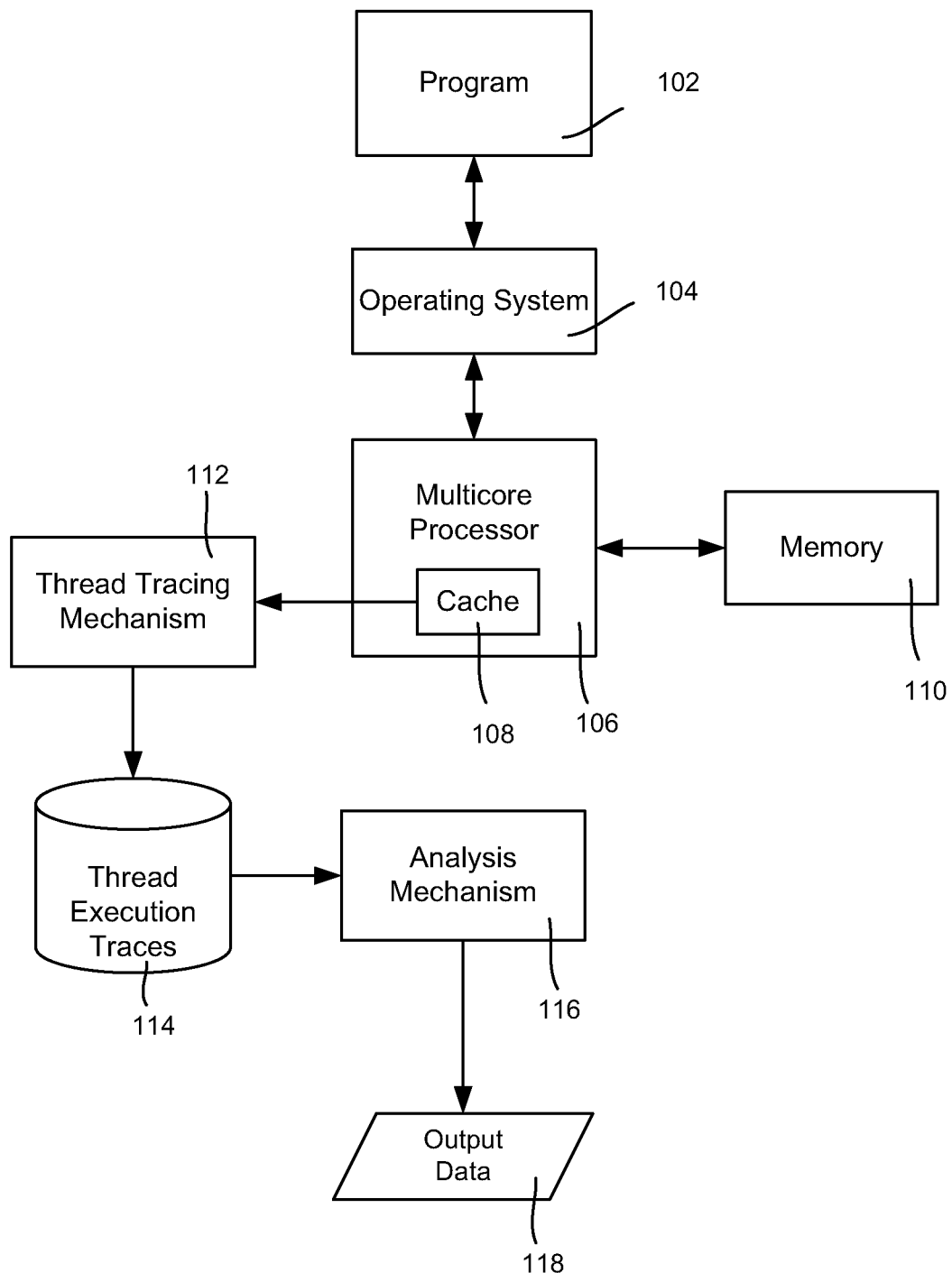
FIG. 1 is a block diagram showing example components for obtaining and using thread execution traces to estimate data access by concurrent threads.

FIG. 1 shows a general computing environment for analyzing a multicore machine, such as for using results of the analysis to estimate thread operation on a multicore machine having a larger number of cores. In this example, a program (or set of programs) 102 runs code via various concurrent threads via an operating system 104. As described below, the threads may access common data and/or generally be executed on a multicore processor 106 in an interleaved manner, whether uniform or non-uniform. As shown herein, the multicore processor 106 includes an on-chip cache, but as will be understood, any other types of caches may be used instead of or in addition to the exemplified on-chip cache 108.

As is known, before accessing an external memory 110, the processor 106 may access the cache 108 to more efficiently locate data. A thread execution tracing mechanism 112 records the cache data accesses as thread execution traces 114. As described below, via one or more models, an analysis mechanism 116 processes the thread traces 114 to provide output data 116 that quantifies how concurrent threads interact with the cache/memory hierarchy and how their data usage affects the efficiency and scalability of a system. The output data 116 may be used to statistically estimate how the programs will operate if scaled to a machine with more cores and thus more concurrent threads.

By way of background, cache reuse refers to how long (not necessarily in time but in number of intervening accesses) it takes for the same block (object) of cached data to be accessed by one or more threads. For a single thread, this is straightforward to measure by tracing the thread's accesses of each block. In one model, for each memory access, the reuse distance is the number of distinct data elements accessed between a given access and the previous access to the same data. For example, in FIG. 2A, (if only thread 1's individual trace is considered), the reuse distance $R_1$ of the later access of the data block b is four (4) because four distinct data elements (c, d, e and f) appear between this second access and the previous access of block b. Note that with reuse distance, only distinct data elements are counted, e.g., if the trace indicates an access pattern of "abcaabad" the reuse distance between the b accesses is two (2) because the two intervening "a" accesses are only counted once.

In general, in a multi-threaded system, threads interleave their cache accesses with other threads during each window of execution. Via tracing, a thread's reuse distance, as affected by accesses from other threads, can be used to build a histogram. However, in doing so, the technology described herein recognizes that the total amount of data accessed in each window of execution may be increased because other threads are also accessing the cache while the one thread is idle or concurrently executing, that is, the reuse distance increases for that thread. Further, the technology described herein also recognizes that the total amount of data accessed in each window of execution may be reduced as a result of shared data accesses, that is, to avoid double counting. In other words, the reuse distance of shared data for a thread get may be shortened due to an intercept, (an intercept refers to an access to a common data block by another thread).

As will be understood, the reuse distance for a thread is thus based on the probability that other threads will increase the reuse distance for data that is not shared, minus the probability that other the threads will decrease the reuse distance for data that is shared. Thus, part of the model is based on determining (e.g., by estimating) how many data blocks of execution traces are probably shared (represented by w), how many are always shared (represented by x), and how many are always private (represented by p); this may be referred to as a WXP model herein.

To this end, the model described herein computes a set of composable, per-thread metrics in a single pass over a concurrent execution, which includes at least four threads (to solve four unknowns). For a system of p threads, the model approximates $O(2^p)$ sharing relations between threads with 2p+2 quantities. The per-thread data sharing model allows modeling concurrent executions that only involve a subset of application threads or executions that include a larger number of similar application threads. In addition to computing miss rates for a shared cache, one extension permits modeling of coherence misses in the interleaved execution on a partitioned cache. There is thus described a composable per-thread data sharing model that is scalable and allows investigating concurrent executions with a smaller or larger number of similar threads. Also described is a model for irregular thread interleaving, which is integrated with the data sharing model.

More particularly, to account for the negative cache interference from other threads, data sharing and thread interleaving are handled. In addition, the system models the positive effect of sharing via a composable model that distinguishes patterns of data sharing. Based on a single pass over an interleaved execution trace, a set of per-thread parameters are computed that may be used to predict performance for various cache sizes, e.g., for sub-clusters of threads or for future environments with a larger number of similar threads.

As used herein, one locality metric is the reuse signature, which is the distribution of the reuse distances. More formally, a reuse signature is a pair including a series of (consecutive and non-overlapping) ranges and a series of frequency counts $<R, C>=<r_1 r_2 \ldots r_n, c_1 c_2 \ldots c_n>$. For example, if $r_1$ is [0, 0] and $c_1$ is 2, two references have a reuse distance in the range [0, 0]. Often the frequency counts are weighted with the total number of data reuses and the locality represented as $<R, P>=<r_1 r_2 \ldots r_n, p_1 p_2 \ldots p_n>$. Then, if a memory reference is chosen at random, the probability its reuse distance is in range $r_i$ is $p_i$. The reuse signature can be used to calculate the miss rate for fully associative least-recently-used (LRU) cache of all sizes.

A memory reference hits if and only if the reuse distance is less than the cache size. Through a known probabilistic conversion, the miss rate for direct-mapped and set-associative cache may be estimated from the reuse signature.

Figure 3:
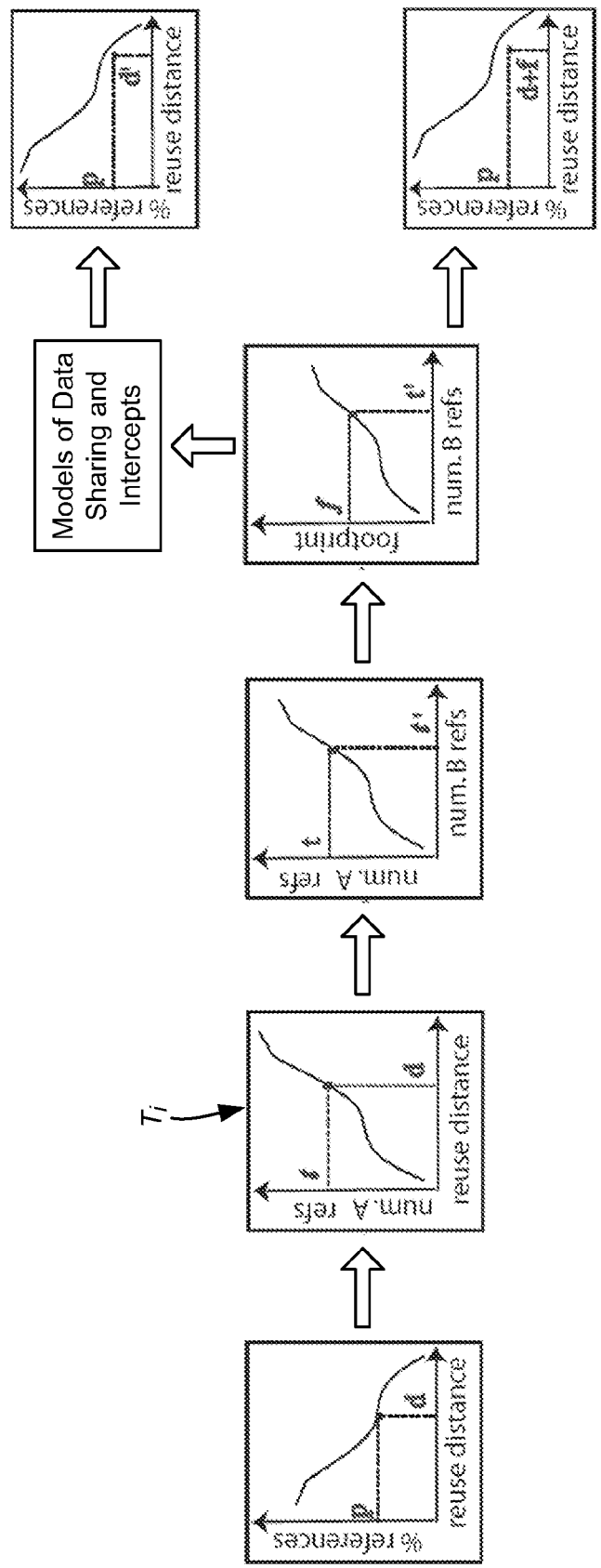
FIG. 3 comprises graphical representations of data structures showing how models of data sharing and intercepts may be determined from thread execution traces.

One locality model described herein comprises five components for each thread of a concurrent program: the reuse signature of the thread, its reuse time map, footprints, the interleaving and the data sharing with other threads. These components, generally represented in FIG. 3, are composed to produce an estimate of the locality when any set of these threads execute concurrently.

Figure 2A:
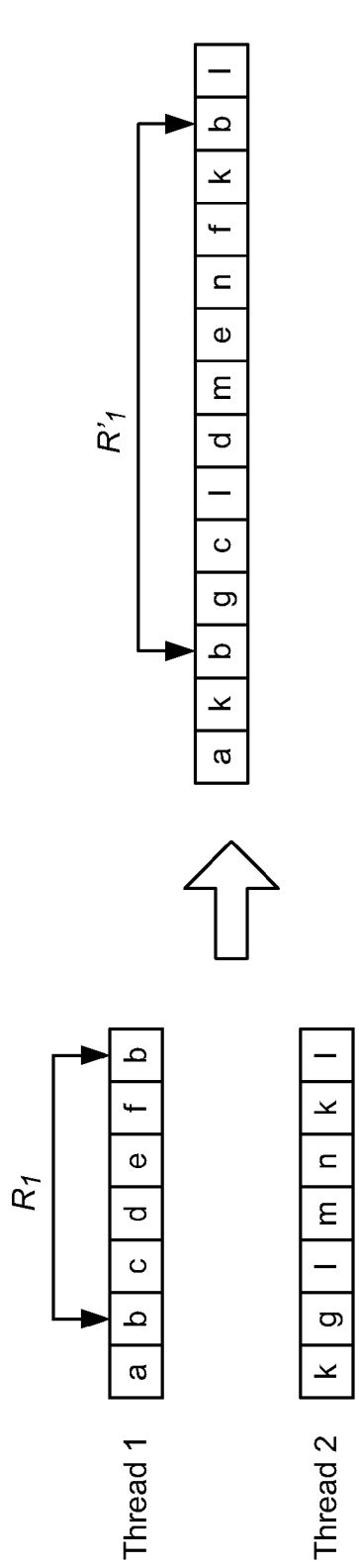
FIG. 2A is a representation of reuse distance aspects of thread data accesses in a uniformly interleaved access pattern.
Figure 2B:
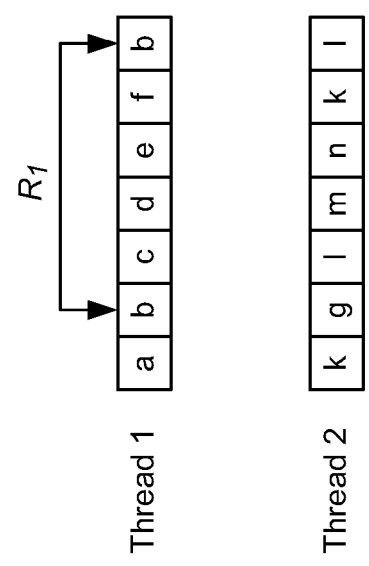
FIG. 2B is a representation of reuse distance aspects of thread data accesses in a non-uniformly interleaved access pattern.

FIGS. 2A and 2B provide an overview of a basic composition process for two threads, Thread 1 and Thread 2, in particular, how the locality of Thread 1 is changed when it is executed concurrently with Thread 2. When threads share a cache but do not share data, the concurrent use effectively reduces the cache size available to each thread. Because locality is determined by reuse distances, that is, the miss rate for various cache sizes, the system needs to know how each reuse distance is changed for a concurrent execution.

By way of example, consider the data access trace for two threads, with the left side of FIG. 2A showing each thread's individual cache accesses and the right portion $R'_1$, showing uniform interleaving. In FIG. 2A, the reuse distance of data block b in Thread 1 changes from the non-interleaving access pattern (reuse distance $R_1=4$) to the interleaving access pattern (reuse distance $R'_1=9$), because Thread 2 accesses five distinct data elements interleaved with Thread 1's accesses. In the second, non-uniform interleaving case (FIG. 2B), a different result exists for the reuse distance of Thread 2, namely reuse distance $R''_1=8$.

Four quantities are used to compute the new reuse distance $R'_1$. The first is the original $R_1$ in the sequential trace of Thread 1. The second is the time window $T(R_1)$ in Thread 1, which is called the reuse time of $R_1$.

Another function, M, determines how accesses from the two threads interleave in the concurrent execution. Given this, $T_2=M(T(R_1))$ is the relevant time window in Thread 2 where Thread 2's accesses affect the new reuse distance R'1. Also, the number of distinct data blocks accessed in $T_2$ is called the footprint of $T_2$, which is denoted as $F(T_2)$. The new reuse distance is $R'1=R_1+F(M(T(R_1)))$. In other words, the reuse distance is lengthened by the footprint of the time window in Thread 2 that coincides with the time of the reuse in Thread 1. This may be used to compute the overall locality of Thread 1 by applying this formula to its reuse distances and generating a new distribution.

Under the assumption of uniform interleaving, the length of the coinciding time windows is computed as $$|T_2| = \frac{N_2}{N_1}|T_1|,$$

where $N_1$ and $N_2$ are the length of the trace of the two threads. If the reuse distances and time windows are represented by their lengths, $$|R'_1| = |R_1| + F(\frac{N_2}{N_1}T(|R_1|)).$$

When there are k threads, the new reuse distance R' is the original R plus the footprint from the other threads, as shown by the following equation:

$$|R'| = |R| + \sum_{p=1 \ldots k, p \neq i} F_p\left(\frac{N_p}{N_i}T_i(|R|)\right)$$

where $T_i$ is the reuse time map in Thread i, and $F_p$ is the footprint map of Thread p. The $T_i$ value computes the expected time window for a reuse distance, and $F_p$ computes the expected footprint for a time window. The equation uses a constant ratio and summation because of the assumption (for illustration purposes) that threads are uniformly interleaved and threads do not share data. A property of the previous model is that cache sharing can never improve the locality because a reuse distance is never shortened.

Numerous reuse distances, the time windows, footprints, and their relations are represented collectively as statistical distributions and their mappings. The reuse signature <R, P> is a distribution, where R is a series of bins representing consecutive ranges, $r_i = (d_i, d_i+1)$, and P is a series of probabilities $p_i$, and the relation is that $p_i$ portion of reuses have distances between $d_i$ and $d_i+1$. In statistical terms, a randomly selected reuse distance has probability $p_i$ to be between $d_i$ and $d_i+1$. From a distribution, statements such as the average reuse distance is X and the most probable reuse distance is Y may be made.

A distribution may be implemented as a histogram, which may be designed to use w-wide logarithmic ranges for its bins, where each consecutive power-of-two range is divided into w bins of equal size. For example, if M is the number of data blocks used by an execution, the reuse signature has a total of w log M entries. The histogram is thus logarithmic in size yet the precision can be tuned by controlling w, which is eight in one implementation.

As generally represented in FIG. 3, the reuse time and the footprint are distribution maps or mappings from one distribution to another. A reuse-time map $T_i$ converts from reuse distance to reuse time. Numerically it is a matrix whose first dimension (rows) comprise bins of reuse distances and second dimension (columns) bins of time-window sizes. Each cell $p_{ij}$ is a probability showing that a reuse distance in the ith distance bin has a probability $p_{ij}$ such that the size of its time window is in the jth window-size bin. The matrix can be read by rows, which shows the distribution of time window sizes for the same reuse distance, or by columns (with additional computation), which shows the distribution of reuse distances for the same time-window size.

Similarly, the footprint map is a matrix with bins of time-window sizes in the first dimension and bins of footprints in the second dimension. Each row shows the distribution of footprints for the same time-window size, and each column shows the distribution of time-window sizes for the same footprint. Note that a reuse window accesses the same data at both boundaries, but a time window can access different data. For a trace of length n, there are O(n) reuse windows but $O(n^2)$ time windows. If randomly selecting a time window in an execution, it is most likely not a reuse window, so the reuse time map cannot represent the footprint map.

In the application model described herein, a concurrent execution of multiple threads is recorded in an interleaved trace. The reuse distance and its reuse time in each thread are measured by extracting from the interleaved trace the accesses by the thread. The footprint may be measured by random sampling of time windows and recording the relation between the window size and the volume of data accessed in the window.

With respect to thread interleaving, as shown in FIG. 2B, the executions of different threads may not interleave uniformly. This is often the case for client applications when threads perform different tasks, and for server workloads in which the relative rate of execution of parallel threads may change from one phase to another. In any event, it is possible for a thread to execute only periodically, and thus the technology described herein considers when threads are executed together, as well as their relative rates of execution.

The technology described herein recognizes that the interleaving only needs to be measured within the two ends of every reuse distance. As a result, during the simulation pass of the interleaved execution trace, the execution counts are recorded, along with the number of executed instructions for each thread, at the last access of each data element. At each memory reference, the memory reference counts between this and the previous access of the same data are computed; the interleaving relation between each thread and all other threads is stored. The total size is quadratic to the number of threads k, since each thread holds k−1 relations. Note that the quadratic cost may be avoided by using a global virtual time and computing the relative rate of execution in each virtual time window; however, this needs an additional map from the reference count of each thread to its virtual time range, and also needs to measure all windows instead of all reuse windows. An alternative is to use an exponential model that measures the interleaving probability for each thread subset.

The examples herein use the quadratic relations. For example, let B be the number of bins in a time histogram. For each thread t, the interleaving with other k−1 threads is represented by two B×(k−1) matrices: the probability matrix and the ratio matrix. In both matrices, each row is a reuse time bin. The element $(b_i, t_j)$ is the probability of a reuse window of size $b_i$ being concurrent with the execution of Thread $t_j$. When they are concurrent, the element $(b_i, t_j)$ in the ratio matrix gives the rate of execution of Thread $t_j$ relative to t in that window.

One implementation denotes the two matrices as Interleave$_t^{prob}$ and Interleave$_t^{rate}$. An example algorithm for computing locality with the interleaving model is shown as follows:

---
Algorithm 1
---
Inputs: (Thread t running with $t_1, t_2, \ldots, t_{k-1}$)
    see data sharing model (Algorithm 2) for the first four inputs
    Interleave$_t^{prob}$ and Interleave$_t^{rate}$: the interleaving probability and rate -continued Algorithm 1

Output
    the reuse signature of t under parallel execution, ReuseSig$_t$,
Algorithm InterleaveShare (ReuseSig$_t$, ReuseTimeMap$_t$,
        FootprintMap$_{t,t_1},...,t_{k-1}$, U,
        Interleave$_t^{prob}$, Interleave$_t^{rate}$)
    foreach reuse distance bin r$_i$ = [d$_1$, d$_2$] that has p$_i$ portion total
    references
      foreach subset S of (t$_1$, ..., t$_{k-1}$)
        dist = GetReuseDis(S ∪ {t}, r$_i$, ReuseTimeMap$_t$,
        FootprintMap, U, Interleave$_t^{ratio}$)
        prob = GetConcurrencyProb(S, Interleave$_t^{prob}$)
        add (dist'p,prob) to ReuseSig$_t$,
      end foreach subset
    end foreach distance bin
End algorithm For each bin in the original reuse signature, the algorithm enumerates the possible companion subsets. For each companion set, the algorithm invokes the sharing or no-sharing data model as a subroutine to compute the new reuse distance. It then computes the probability prob that Thread t runs concurrently with (and only with) the companion subset, to thereby weigh the new reuse distance by prob. The subset enumeration includes the empty set, in which case Thread t runs by itself.

The subroutine GetConcurrencyProb uses a standard inclusion/exclusion method and is omitted herein for brevity. The algorithm calls the subroutine GetReuseDis to compute the effect of concurrent execution on r$_i$. It assumes uniform interleaving and uses the formula described above. Note that the uniformity is used only for the same bin in the same companion thread set; it will not be uniform for the whole execution unless every column of the ratio matrix has the same value, and every number in the probability matrix equals one (1). In general, this model effectively accounts for a full range of possible interleaving.

Turning to aspects related to concurrent threads that share data in the cache, one model captures data sharing in a composable manner. As will be understood, this can be used to compute the miss rate of the interleaved concurrent execution when accessing a shared cache.

In one implementation, the per-thread data accesses are modeled by dividing them into three components, including shared data, which has the same size (denoted x) for all threads. This represents shared data that is always accessed in the given scenario. For example, global constants, the root node of a B-tree, or the first node of a shared (linked) list are always accessed whenever related data is needed.

A second type is potentially shared data, of which each thread accesses from the same pool. The size of the shared pool, denoted w, is the same for all threads. The portion of data blocks in w accessed by thread i is m$_i$ (0≤m$_i$≤1). This category represents shared data that is not necessarily accessed by all threads, such as the leaf nodes of shared tree structures.

A third component is the private data accessed by each thread, denoted as size p$_i$ for thread i. Then, the size of data accessed by thread i, or the data universe of i, u$_i$, is the sum of the three components, u$_i$=x+m$_i$w+p$_i$.

Figure 4:
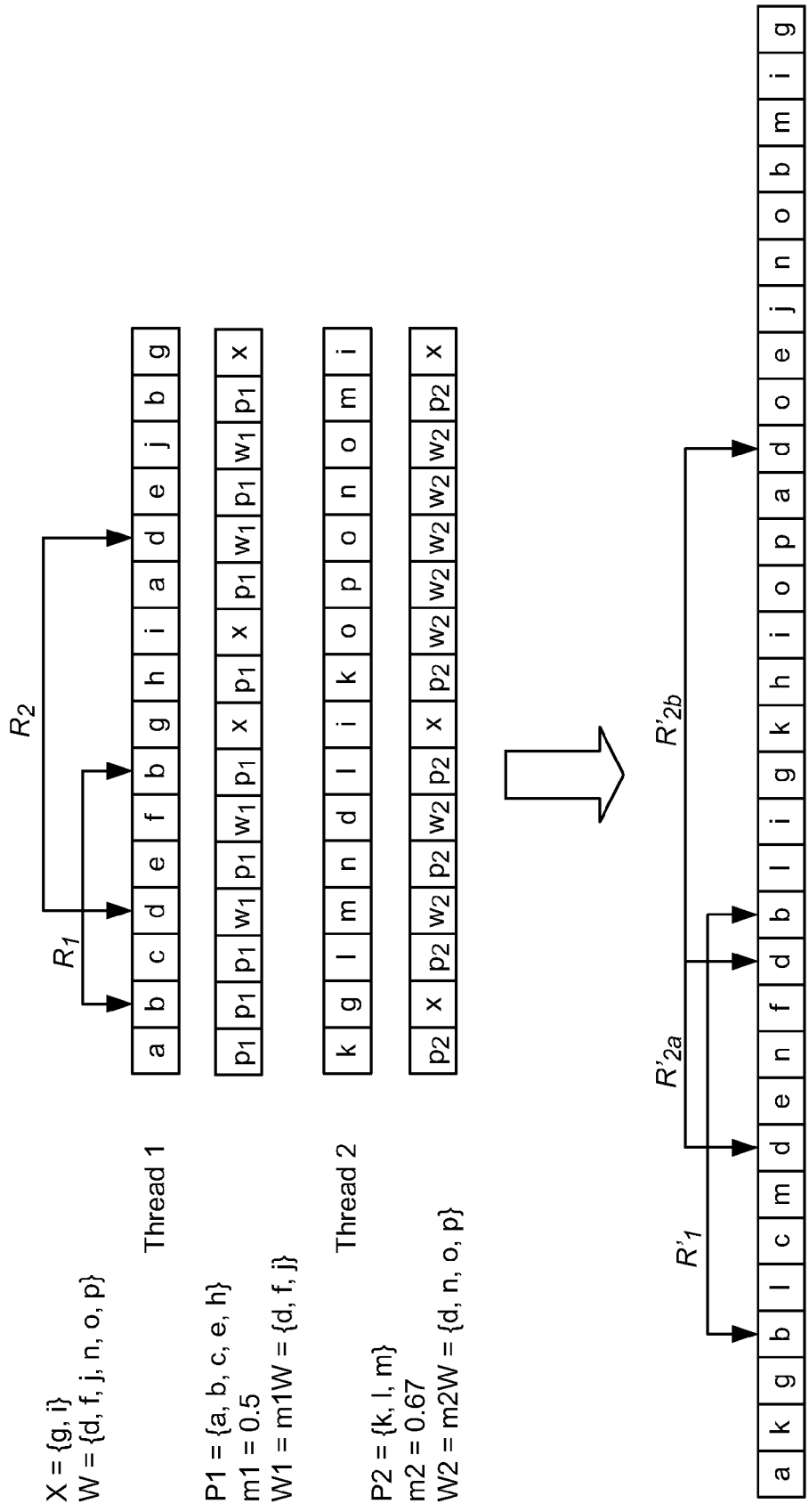
FIG. 4 is a representation of reuse distance aspects of thread data accesses in a non-uniformly interleaved access pattern with intercepts resulting from data sharing.

FIG. 4 illustrates this data sharing model and the effect of intercepts with a two thread example. Note that while the example shows a model (WXP) as sets for illustrative purposes, the exemplified model only computes the sizes of these sets, and not their contents. This model is a deliberate approximation since for efficiency it is not scalable to record the sharing among all subsets of threads.

For a system of k threads, the model approximates these O($2^k$) relations with 2k+2 quantities, namely two numbers per thread, p$_i$ and m$_i$, and two numbers for the system, x and w. In addition, the impact of additional threads may be investigated by modeling their data sharing with these parameters p$_i$ and m$_i$.

The model can approximate asymmetrical sharing. If a sub-group of threads share more data than they do with others, they will have higher m$_i$s. The model does not constrain the size of private data in threads. Each can have any size p$_i$. The model is reasonably precise in approximating the exponential numbers of data sharing relations with a linear-size model. A significant complication, even in this simplified model, is that none of the 2p+2 numbers can be directly measured. For example, if a data block is accessed by all threads in a concurrent execution, the block could be part of x (always shared data), but it could also be part of w (potentially shared data) if it just happened to be accessed by all threads. Similarly, if a block is accessed by only one thread, it may belong to either w or p (private data).

The model may be built by running the interleaved execution once and recording the set of data blocks accessed by each thread. Then the amount of data sharing between any subset of threads is computed. The computation cost is O(M$2^k$) and the space cost is O(M), where M is the number of data blocks. In one implementation, the execution trace is simulated only once; these measured sets are termed as universes.

The average size of the shared universe between two threads, three threads, and four threads is computed as follows: let the three numbers be $\bar{u}^2$, $\bar{u}^3$, and $\bar{u}^4$. The average is $\bar{m}$=mean(m$_i$). Observe that from $$\bar{u}^2 \approx x + \bar{m}^2 w$$

$$\bar{u}^3 \approx x + \bar{m}^3 w$$

$$\bar{u}^4 \approx x + \bar{m}^4 w$$

is computed:

$$\bar{m} = \frac{\bar{u}^3 - \bar{u}^4}{\bar{u}^2 - \bar{u}^3}$$

With this average, x and w are solved using any of the above two (now linear) equations for $\bar{u}^2$, $\bar{u}^3$, and $\bar{u}^4$. Any two may be chosen because a solution to any two is the solution to all three.

A last step is to compute the approximation of m$_i$ and p$_i$: let u$_{i,j}$ denote the size of shared universe by threads i and j. Then $$\frac{m_i}{m_j} = \frac{u_{i,q}}{u_{j,q}}$$

for q≠i, j. To improve precision, the ratio may be approximated by the average from all q. Once there is an estimate for $$\frac{m_j}{m_1}$$

for all $j \neq 1$, the system computes $$m_1 = \frac{\overline{m}p}{1 + \sum_j \frac{m_j}{m_1}}$$

and then $$m_j = \frac{m_j}{m_1} m_1.$$

Also, $p_i = u_i - m_i w - x$, where $u_i$ is the size of the data accessed by thread i.

Consider the example in FIG. 4 (where the system contains two threads, and w, x and p indicate the possibly shared, always shared and private blocks) and the task of computing the change to the reuse distance R2 in Thread 1 due to Thread 1's interleaved execution with Thread 2. Since the two threads share data, two effects are modeled. The first effect is data sharing; for example, data i is accessed by both threads during the course of $R_2$ and should not be double counted in $R'_2$. The second effect is intercepts; since Thread 2 accesses block d during $R_2$, two reuse distances result, $R'_{2a}$ and $R'_{2b}$. Note for example that the d block is also accessed by thread 1, i.e., this is the intercept concept.

The algorithm for the k-thread case is given in the following algorithm for computing the effect of concurrent execution on reuse distance r in Thread t, when t is executed with k−1 other threads, with shared cache and shared data, (where Thread t is running with Threads $t_1, \ldots, t_{k-1}$):

---
Algorithm 2

Inputs: (Thread t running with $t_1, t_2; \ldots, t_{k-1}$)
    r: a reuse distance in Thread t running in isolation
    ReuseTimeMap$_t$: the reuse time map of Thread t
    FootprintMap$_{t_1, \ldots, t_{k-1}}$: the footprint map of Threads $t_1, t_2, \ldots, t_{k-1}$
    $U_{t, t_1, \ldots, t_{k-1}}$: the WXP data sharing model of Threads t, $t_1, t_2, \ldots, t_{k-1}$
    $M_{t, t_1, \ldots, t_{k-1}}$: data size of Threads t, $t_1, t_2, \ldots, t_{k-1}$
    Ratio$_{t_1, \ldots, t_{k-1}}$: ratio of instruction rate of Threads $t_1, t_2, \ldots, t_{k-1}$ over that of Thread t,
        computed by the interleaving model later
Output
    r': the modified reuse distance considering parallel execution and data sharing
Algorithm GetShareReuseDistance (r, ReuseTimeMap$_t$, FootprintMap$_{t_1, \ldots, t_{k-1}}$,
        $U_{t, t_1, \ldots, t_{k-1}}, M_{t, t_1, \ldots, t_{k-1}}$, Ratio$_{t_1, \ldots, t_{k-1}}$)
    the time window of r in Thread t is time$_t$ = ReuseTimeMap$_t$(r)
    the coinciding time window in Thread $t_i$ is time$_{t_i}$ = time$_t$Ratio$_{t_i}$, i = 1, ..., (k − 1)
    the footprint of $t_i$ is $f_{t_i}$ = FootprintMap$_{t_i}$ (time$_{t_i}$); i = 1, ..., (k − 1)
    decompose r into $<r^x; r^w; r^p>$ such that $r^x + r^w + r^p = r$ and $r^x : r^w : r^p = U^x : U_t^w : U_t^p$
    decompose each $f_{t_1}$ into $<f_{t_1}^x : f_{t_1}^w : f_{k_1}^p>$ similarly based on $U^x, U_{t_1}^w$, and $U_{t_1}^p$
    data$_{shared}$ = GetUnionSize($r^x, f_{t_1}^x, \ldots, f_{t_k}^x; r^w; f_{t_1}^w, \ldots, f_{t_k}^w$)
    dis$_{no\ intercept} = r^p + \Sigma f_{t_1}^p$ + data$_{shared}$ $$\text{prob}_{intercept} = \frac{r^x}{M_t} + \frac{r^w}{M_t}$$

$$\text{dis}_{intercept} = \frac{\text{dis}_{no\ intercept}}{k}$$

return dis$_{no\ intercept}$(1 − prob$_{intercept}$) + dis$_{intercept}$prob$_{intercept}$
End algorithm

---

As can be seen, the data sharing model requires at least four threads to solve a non-linear equation to obtain these hidden parameters, and as mentioned above, the model is referred to as WXP for its three components. While WXP approximates the cumulative sharing over an entire trace, note that it can be used as the average of active data sharing for any execution window. Further, the model enables composing thread behavior in an abstract but quantitative manner, e.g., a thread may be "cloned" by giving a new thread the same WXP, which means that the new thread accesses shared and private data in the same way as the original. In this way the behavior of hypothetical thread groups may be studied independent of their sizes.

The composable data sharing model may be used to compute the shared cache miss rate. A general task computes the effect of concurrent execution on each reuse distance of each thread. The overall miss rate can then be computed by iterating the solution on all reuse distances and all threads; note a reuse distance refers to a reuse-distance bin in the histogram, which represents the group of reuses whose distance falls within a range.

The inputs to the model include the reuse-distance bin r, the reuse-time map of Thread t, the footprint map, the data sharing model, i.e. the WXPs, and the data size for all threads, and the ratio of instruction rates between other threads and Thread t. The last parameter gives the relative size of execution windows among threads. In uniform interleaving, $$\text{Ratio}_{ij} = \frac{N_{ti}}{N_t},$$

where $N_{ti}$ and $N_t$ are the length of trace $t_i$ and t respectively. In one solution, the ratio is supplied by the interleaving model described above.

Algorithm 2 includes nine statements that can be divided into three stages. Stage 1 computes the footprint for the (k−1) peer threads, and includes three statements, namely finding the length of the time window of r in Thread 1, finding the coinciding time windows in peer threads, and finding the footprint in these windows.

Stage 2 computes the reuse distance assuming no intercept. It has four statements, including decomposing r based on the WXP model, decomposing footprints $f_{t_i}$ based on the WXP model, computing the size of shared data data$_{shared}$, and adding it to the size of private data to obtain the result, dis$_{no\ intercept}$.

Note that one step in Stage 2 is for estimating the overlap in shared-data access. From the WXP model, the shared-data components in the reuse distance r and each footprint $f_{t_i}$ are separated. Consider the X components: $r^x$ from the reuse distance and $f_{t_i}^x$ from each footprint. To estimate the size of the union of these k data sets, let the union size be $s_{union}$. This gives:

$$s_{max} = \max(r^x f_{t_1}^x, \ldots \ldots f_{t_{k-1}}^x) \leq s_{union} \leq s_{sum} = \text{sum}(r^x f_{t_1}^x, \ldots f_{t_{k-1}}^x)$$

$s_{union}$ is bounded by two extreme cases, namely the size of full data sharing, $s_{max}$, where the union is as large as the largest component; and no data sharing, $s_{sum}$, where the union is the total size of all components.

An estimate of $s_{union}$ is made by taking the joint probability, that is, by taking $$\frac{r^x}{U^x}, \frac{f_{t_i}}{U^x}$$

as the probability that an x block belongs to a component, and computing $s_{union}$ as the union of their probabilities using the inclusion-exclusion principle. Let $p_1, p_2, \ldots, p_k$ be the probabilities. The union $p_{union}$ is:

$$p_{union} = \sum_{i=1}^{n} (-1)^{i-1} \sum_{\text{all subset } S \text{ of size } i} \prod_{i \in S} p_i$$

Then, $s_{union} = p_{union} U^x$, where $U^x$ is the size of the x data in the WXP model. Note that $U^x$ is cumulative sharing and not necessarily the active sharing, especially in small execution windows. Different methods of estimating the working set size may be used (note that because different threads may execute a very different number of instructions during a time window, it is unclear what a common working set means). The sum of all components $s_{sum} = \text{sum}(r^x, f_{t_1}^x, \ldots, f_{t_{k-1}}^x)$ thus may be used for smaller ranges of r. Instead of setting an arbitrary threshold, the model dynamically picks from $s_{sum}$ and $s_{union}$ the one that is closest to mean($s_{max}, s_{sum}$). Because $s_{max}$ and $s_{sum}$ are the lower and upper bounds of $s_{union}$, the intent is to pick the value that is not "too low" or "too high."

The shared portion of W data is computed in the same way. The total shared data, data$_{shared}$, is the sum of the two. The reuse distance without an intercept, dis$_{no\ intercept}$, is the sum of private data accessed by all threads plus data$_{shared}$, as shown by the last statement in Stage 2 of the algorithm 2.

When predicting for a large number of threads, the exponential-cost inclusion/exclusion computation is approximated by first calculating the average probability and then computing as if all threads have this probability. The approximation may overestimate the amount of data sharing, however the time cost is linear to the number of threads.

Stage 3 of the algorithm computes the effect of intercepts. The probability and the frequency of intercepts depend on the overlap among shared-data components. Two heuristics may be used, namely that the average probability of the intercept is the relative size of shared data in Thread t, and the number of the intercepts is the number of thread peers. The denominator of k when computing dis$_{intercept}$ is because k−1 threads cause k−1 intercepts that divide a time window into k sections. Note that algorithm 1 is used to compute the overall locality of the concurrent execution, but with GetShareReuseDis (described in Algorithm 2) replacing GetReuseDis.

An extension for modeling coherence misses allows extending the model to compute locality for partitioned caches. If each thread accesses a separate partitioned cache, then the only way for another thread to impact its locality is by writing to a shared data item that results in a cache invalidation (ignoring the impact of write to read downgrades). This situation only impacts the cache miss rate computation when the second thread intercepts the reuse distance of the first thread (as in FIG. 4), the intercept is a write access, and the reuse distance was less than the cache size (otherwise the access would have anyway counted as a capacity miss). The number of coherence misses can be modeled by multiplying the intercept probability with the probability that the corresponding access was a write. This write probability can be estimated from the interleaved trace. When multiple threads share a partitioned cache, the shared cache, shared data model is first used to estimate the combined reuse distances for each partitioned cache, and then to model coherence misses across these caches.

Exemplary Operating Environment

Figure 5:
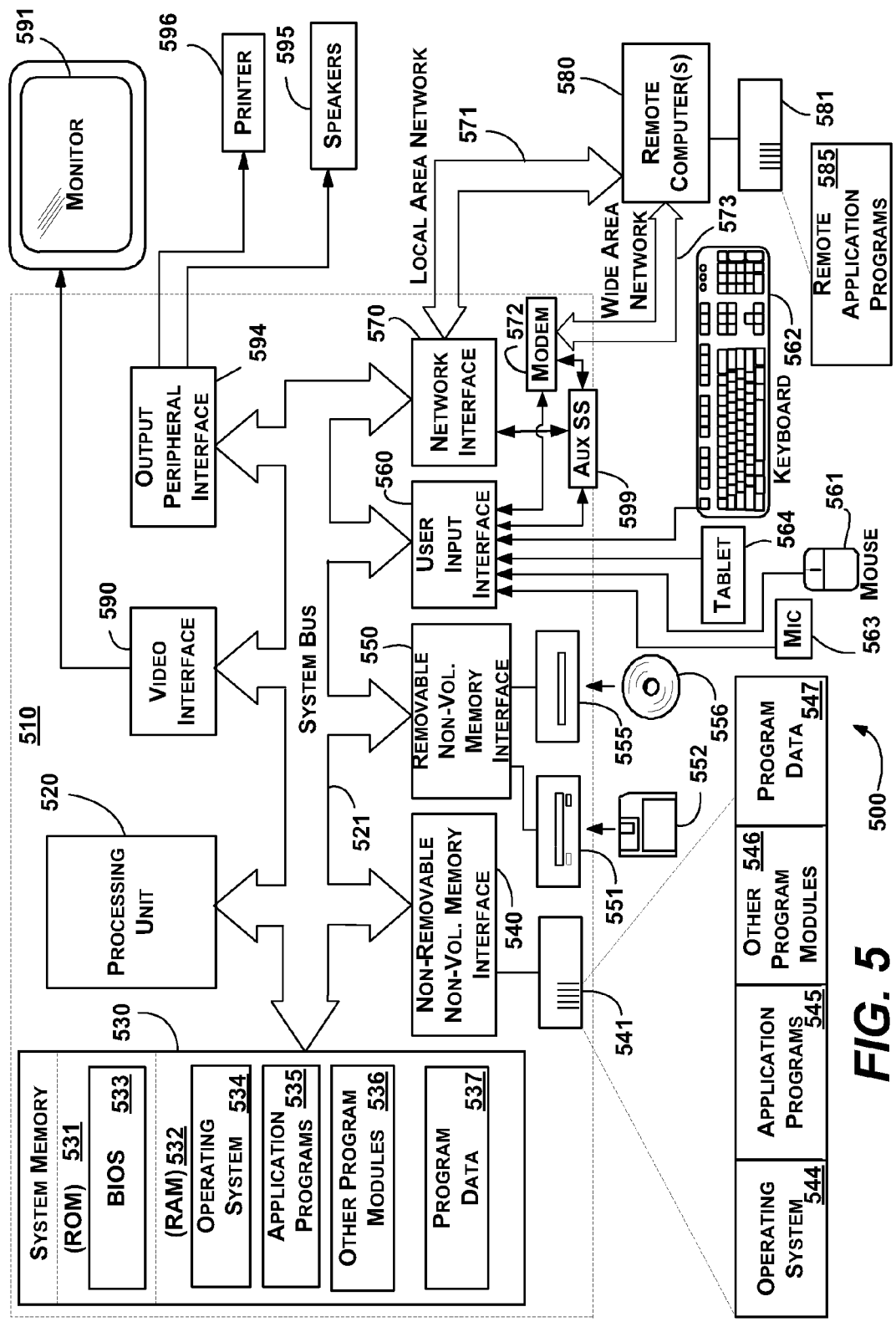
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment having a plurality of threads, a method comprising, obtaining a plurality of execution traces, each execution trace corresponding to a thread and that thread's accesses to data elements in a cache, and using the execution traces to determine a model for predicting cache locality, including computing a probability of a change to a reuse distance for a thread based upon non-uniform interleaved execution with another thread.

2. The method of claim 1 wherein using the execution traces to determine the model comprises computing a probability that one thread's reuse distance between cache data accesses will increase because of other threads.

3. The method of claim 1 wherein using the execution traces comprises computing an interleaving model that determines how accesses from peer threads affect one thread's reuse distance.

4. The method of claim 3 wherein computing the probability comprises finding footprints for other threads, and using the footprints to compute the reuse distance without considering intercept effects.

5. The method of claim 1 wherein using the execution traces to determine the model comprises computing a probability that one thread's reuse distance between cache data accesses will decrease because of other threads.

6. The method of claim 5 wherein computing the probability comprises determining intercept effects based upon a size estimate of shared data of the one thread and a count of the number of other threads.

7. The method of claim 1 wherein using the execution traces to determine the model comprises computing a first probability that other threads will increase a reuse distance between cache data accesses, and computing a second probability that other the threads will decrease a reuse distance between cache data accesses.

8. The method of claim 7 wherein using the execution traces comprises estimating a first set of data blocks that are always shared, estimating a second set of data blocks that are possibly shared, and estimating a third set of data blocks that are private.

9. The method of claim 7 wherein the cache is a partitioned cache, and wherein computing the second probability comprises using an estimated write probability.

10. The method of claim 1 wherein using the execution traces to determine a model for predicting cache locality comprises predicting cache locality in an computing environment having a larger number of threads than the plurality of threads and estimating a miss rate corresponding to a given cache size.

11. In a computing environment, a system comprising, a multicore processor having a cache accessed by a plurality of threads, a thread tracing mechanism that obtains execution traces corresponding to each thread's access to data blocks in the cache, and an analysis mechanism that builds a model by analyzing the execution traces, including to approximate asymmetrical sharing of a sub-group of the plurality of threads and to estimate effects of concurrent execution on at least some reuse distances of at least one of the threads by using the execution traces to compute a probability that other threads will modify a reuse distance between cache data accesses by one thread.

12. The system of claim 11 wherein the cache is an on-chip cache incorporated into the multicore processor, and wherein the plurality of threads comprises at least four threads.

13. The system of claim 11 wherein the analysis mechanism uses the execution traces to compute a first probability that other threads will increase a reuse distance between cache data accesses by one thread, and a second probability that other the threads will decrease a reuse distance between cache data accesses by the one thread.

14. The system of claim 13 wherein the analysis mechanism computes the first probability by finding footprints for other the threads, and using the footprints to compute the reuse distances without considering intercept effects.

15. The system of claim 13 wherein the analysis mechanism computes the second probability by determining intercept effects based upon a size estimate of shared data of the one thread and a count of the number of other threads.

16. The system of claim 14 wherein the analysis mechanism estimates data blocks that are shared, data blocks that are possibly shared, or data blocks that are private, or any combination of data blocks that are shared, data blocks that are possibly shared, or data blocks that are private.

17. The system of claim 14 wherein the cache is a partitioned cache, and wherein the analysis mechanism computes the second probability based upon a write probability.

18. One or more computer-readable storage media having computer-executable instructions, which when executed perform steps, comprising, computing a footprint for peer threads of a selected thread; computing a reuse distance without intercept effects; and modifying the reuse distance based on intercept effects, including modeling a number of coherence misses using an intercept probability and a write probability.

19. The one or more computer-readable storage media of claim 18 wherein computing the reuse distance without intercept effects comprises computing an amount of shared data, and wherein modifying the reuse distance includes determining the intercept effects based upon a size estimate of shared data of the selected thread and a number of peer threads and identifying a data block that is always shared, possibly shared, or private.

20. The one or more computer-readable storage media of claim 18 having further computer-executable instructions comprising, using the modified reuse distance to predict cache locality for a number of threads that is greater than a number of the peer threads and the selected thread.

* * * * *